United States Patent [19]

Morawski

[11] 4,121,847

[45] Oct. 24, 1978

[54] COLLET CHUCK

[76] Inventor: London T. Morawski, 11487 E. Nine Mile Rd., Warren, Mich. 48090

[21] Appl. No.: 846,513

[22] Filed: Oct. 28, 1977

[51] Int. Cl.$^2$ .................. B23B 5/22; B23B 5/34; B23B 31/14

[52] U.S. Cl. .................. 279/2 R; 82/44; 242/72.1

[58] Field of Search .......... 279/2 R; 82/44; 242/72.1

[56] References Cited

U.S. PATENT DOCUMENTS

| | | | |
|---|---|---|---|
| 3,637,156 | 1/1972 | Shepherd | 242/72.1 |
| 3,921,993 | 11/1975 | Ingham et al. | 279/2 R X |

*Primary Examiner*—Travis S. McGehee

*Attorney, Agent, or Firm*—Barnes, Kisselle, Raisch & Choate

[57] ABSTRACT

A collet chuck has a sleeve which is resiliently flexible radially and provided with two axially spaced work-gripping surfaces and two axially spaced conical surfaces on its outer and inner peripheries, respectively. In response to axial movement of an actuator on the chuck body, the collet sleeve is first shifted axially to engage one of said conical surfaces with a similar surface on the chuck body to displace one of the gripping surfaces radially into engagement with one section of a workpiece. Continued movement of the actuator causes a conical surface thereon to engage the other conical surface on the collet sleeve to displace the other work-gripping surface radially into engagement with another section of the workpiece displaced axially from the first section.

13 Claims, 6 Drawing Figures

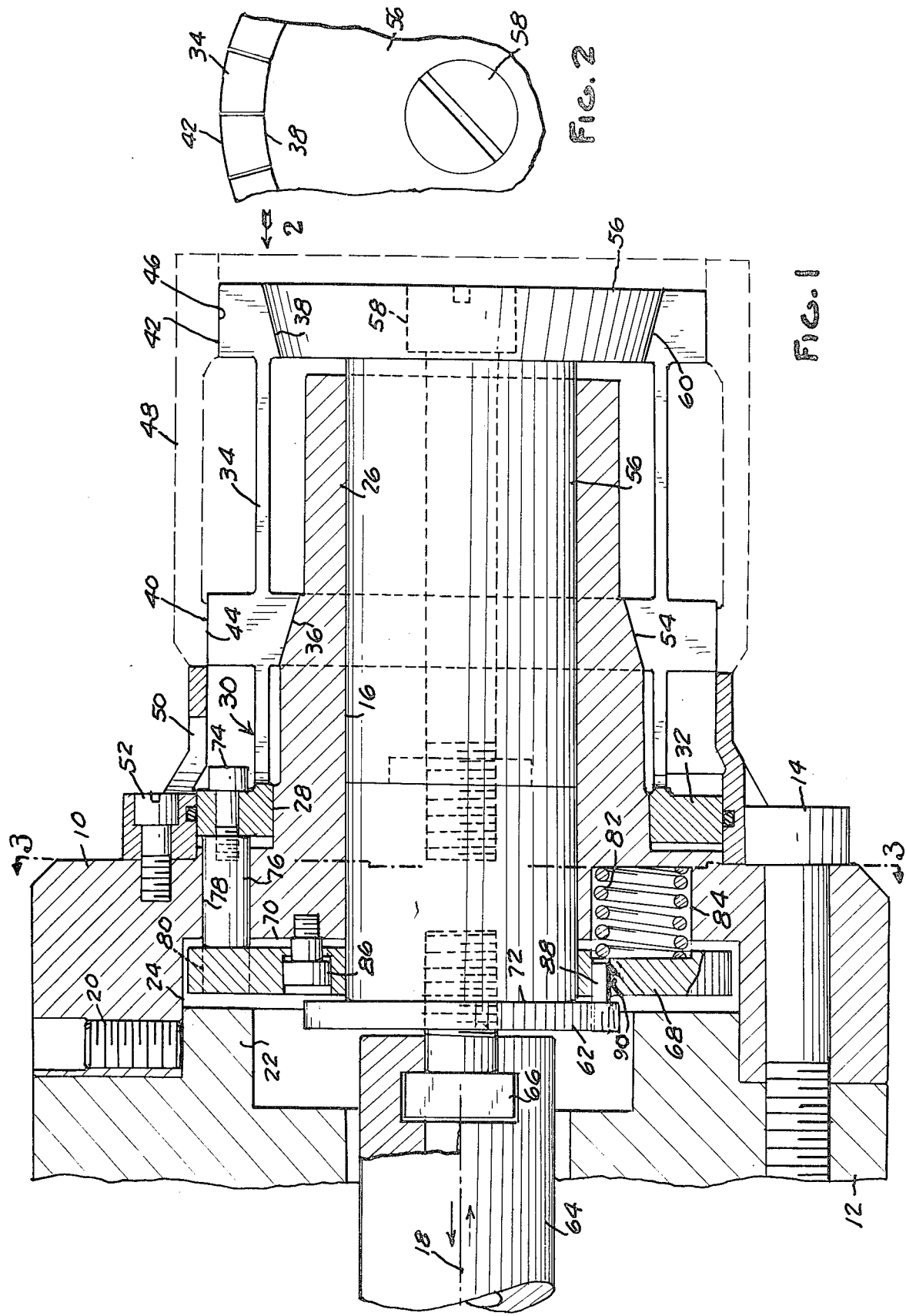

COLLET CHUCK

This invention relates to collet chucks, and, more particularly, to a collet chuck for gripping workpieces at two axially spaced diameters.

Many workpieces, particularly tubular workpieces, that are machined around their outer periphery are subjected to initial roughing cuts which are relatively heavy. If such a workpiece is not structurally rigid or has a relatively thin wall section, it will flex and distort during machining if supported at only one end thereof. Thus, it is important to grip such workpieces at diameters adjacent both ends thereof in order to machine them to accurate finish dimensions. When such a workpiece is gripped by a collet chuck having dual diameters and a single actuator for displacing both gripping diameters simultaneously, it frequently occurs that one end of the workpiece is gripped much tighter than the other end. This is particularly true when the two cylindrical surfaces of the workpiece that are designed to be gripped by the chuck are of at least slightly different diameters. This is due primarily to the fact that, because of the tolerances on the two diameters gripped by the collet, one diameter is engaged prior to the other while both gripping surfaces of the collet are being displaced in a gripping direction at the same time.

The object of the present invention is to provide a collet chuck adapted to grip a workpiece at axially spaced diameters with the same or at least the desired gripping force at each of the gripped portions of the workpiece.

More specifically, the collet chuck of this invention has a collet sleeve provided with two work-gripping surfaces and two actuating mechanisms arranged to be actuated successively and independently for causing the work-gripping surfaces of the collet sleeve to apply the desired gripping force to each gripped diameter of the workpiece. However, both actuating mechanisms are interconnected by a lost-motion coupling and are operated by a single drawbar.

Other objects, features and advantages of the present invention will become apparent from the following description and accompanying drawings, in which:

FIG. 1 is a longitudinal sectional view of a collet chuck of the present invention taken along the line 1—1 in FIG. 3;

FIG. 2 is a fragmentary end elevational view of the chuck as viewed along the arrow 2 in FIG. 1;

Figure 4:
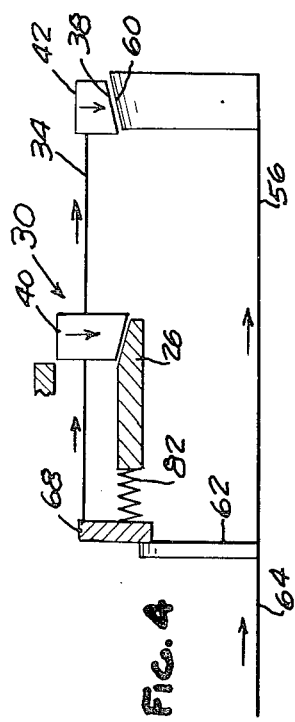
FIGS. 4, 5 and 6 are diagrammatic views illustrating the manner in which the chuck operates.

Referring to FIG. 1, the collet chuck of the present invention includes a body 10 mounted on the rotary spindle 12 of a machine tool by means of a plurality of bolts 14. Body 10 is provided with a central axial bore 16 which is accurately concentric with the axis 18 of spindle 12. This concentricity is obtained by means of adjusting screws 20 extending through body 10 and engaging a pilot portion 22 on spindle 12 which is received within a counterbore 24 at the axially inner end of body 10. Body 10 has a cylindrical shank portion 26 formed with a cylindrical guide surface 28 around its outer periphery. A collet sleeve 30 is formed with an annular flange 32 at one end thereof which is slideably received on the cylindrical guide surface 28 of shank 26. Collet sleeve 30 comprises a plurality of circumferentially adjacent spring fingers 34 projecting axially from flange 32. The inner periphery of collet sleeve 30 is formed with two reversely inclined and axially spaced conical surfaces 36,38. A pair of such surfaces 36,38 are preferably formed on each spring finger 34 and each spring finger 34 is radially flexible between the surfaces 36,38. On their outer periphery the spring fingers are formed with cylindrical work-gripping surfaces 40,42 which are radially aligned with the conical surfaces 36,38, respectively. All of these surfaces are accurately concentric with the axis 18 of spindle 12 and body 10. In the arrangement illustrates surfaces 40,42 are adapted to engage and grip against the cylindrical surfaces 44,46 of a workpiece 48. Cylindrical surface 46 has a smaller diameter than cylindrical surface 44 so that the workpiece can be readily telescoped over the collet sleeve. A locator ring 50 secured to body 10 by screws 52 is adapted to be abutted by one end of the workpiece to properly locate it axially on the chuck.

Shank 26 of body 10 is formed around its outer periphery with a conical surface 54 similarly inclined to and adapted to engage with the conical surface 36 on collet sleeve 30. Within bore 16 of body 10 there is arranged an actuator shaft 56 which is formed of two axially adjacent sections secured together by a screw 58. At its axially outer end shaft 56 is formed with a conical surface 60 similarly inclined and adapted to engage with the conical surface 38 adjacent the free end of sleeve 30. At its inner end shaft 56 is formed with a radially enlarged flange 62 and is connected to an axially reciprocable drawbar 64 by means of a headed screw 66. A disc 68 is slideably arranged on the portion of shaft 56 between the bottom surface 70 of counterbore 24 and the adjacent face 72 of flange 62. The inner end of collet sleeve 30 is connected to disc 68 by means of screws 74 which engage with pins 76 extending through holes 78 in body 10 and fixedly connected with disc 68 as at 80. Collet sleeve 30 is biased axially inwardly, that is, toward spindle 12, by means of a plurality of compression springs 82 housed in cylindrical sockets 84 in body 10 and bearing against one side of disc 68. The extent of axial movement of sleeve 30 relative to body 10 in an outward direction is limited by the abutment of disc 68 with the bottom face 70 of counterbore 24. The extent of axial movement of sleeve 30 relative to body 10 in an inward direction is limited by a plurality of shoulder screws 86. A dowel pin 88 on flange 62 slideably engages an opening 90 in disc 68 to prevent relative rotation between shaft 56 and sleeve 30.

In FIG. 1 the collet is illustrated in the work-gripping condition. In this condition drawbar 64 is in its fully retracted position and applies a predetermined expansion force against the outer end of fingers 34 at the surfaces 38,60 so that the required gripping force is applied to the workpiece at the cylindrical surface 46. At the same time springs 82 apply a predetermined force against disc 68 so as to produce the desired gripping force on the cylindrical surface 44 of the workpiece by reason of the interengaged surfaces 36,54.

Figure 5:
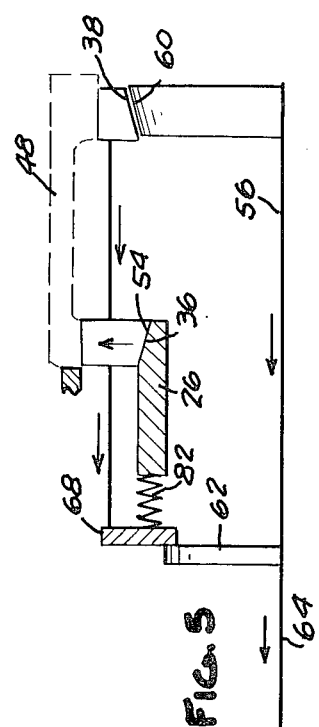
Figure 6:
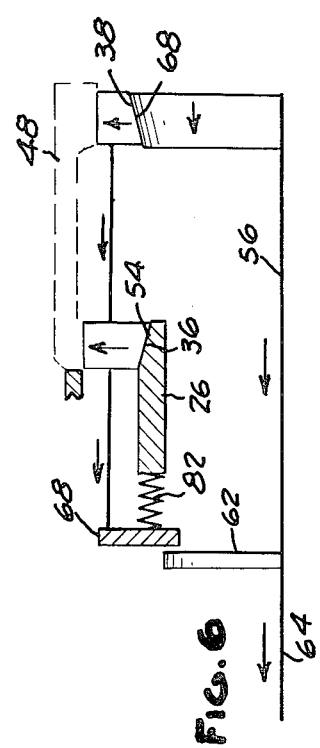
Figure 3:
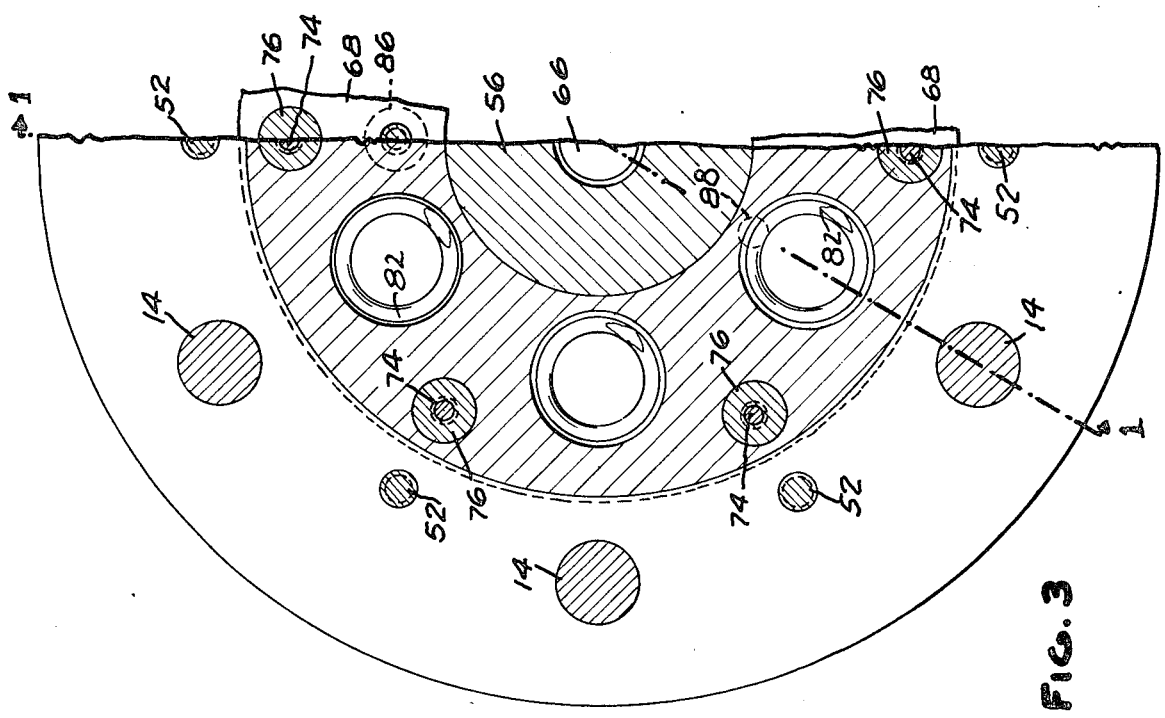
FIG. 3 is a fragmentary sectional view of the chuck taken generally along the line 3—3 in FIG. 1.

A clear understanding of the operation of the chuck is illustrated in FIGS. 4 through 6. In FIG. 4 the chuck is shown in the disengaged condition. In this condition, shaft 56 is displaced forwardly by drawbar 64 and the collet sleeve 30 is likewise shifted to its forwardmost position by flange 62 on shaft 56. Spring fingers 34 are thus permitted to flex radially inwardly and, thus, reduce the outer diameter of sleeve 30 at the surfaces 40,42. With the collet sleeve in the contracted condition shown in FIG. 4 the workpiece 48 can be telescoped over the end of the collet sleeve 30. Thereafter, drawbar 64 is retracted to shift shaft 56 and disc 68 axially inwardly. As soon as shaft 56 starts to shift axially inwardly, springs 82 bias disc 68 in a direction away from the bottom face 70 of counterbore 24 and, thus, shift collet sleeve 30 axially inwardly. This axial inward movement of collet sleeve 30 continues until further movement of disc 68 in an axially inward direction is arrested by the interengagement of the conical surface 36 of collet sleeve 30 with the conical surface 54 of the tubular portion 26 of body 10. As these surfaces interengage the inner end portion of collet sleeve 30 is radially expanded so that the work-gripping surface 40 of the collet sleeve is displaced radially outwardly into firm frictional engagement with the cylindrical surface 44 of workpiece 48. At the same time, since the collet sleeve 30 is being shifted axially inwardly, the workpiece 48 is brought into firm abutting engagement with the stop 50 to properly locate the workpiece on the chuck. The force with which the cylindrical surface 44 of the workpiece is engaged by the collet is determined by the tension of springs 82. Thus, this force can be rather accurately predetermined. This condition of the chuck is illustrated diagrammatically in FIG. 5 wherein it will be noted that the conical surface 60 on shaft 56 has not yet engaged the conical surface 38 on the collet sleeve 30.

Continued retraction movement of drawbar 64 does not result in any further retraction of collet sleeve 30 since, as pointed out, the extent to which collet sleeve 30 can shift axially inwardly is limited by the interengagement of the conical surfaces 54,36. However, shaft 56 continues to move axially inwardly relative to sleeve 30 so that the conical surface 60 at the outer end thereof eventually engages the conical surface 38 of collet sleeve 30. When this occurs, the outer end of the collet is expanded so that the cylindrical surface 42 of the collet is brought into firm engagement with the cylindrical surface 46 of the workpiece 48. At this time the force with which the surface 42 engages the surface 46 is determined by the axial inward force applied to shaft 56 by drawbar 64. Since this force can also be controlled as desired, it follows that the force with which the collet sleeve grips the workpiece at both ends thereof can be rather accurately predetermined. The condition of the collet when it firmly grips both ends of the workpiece is illustrated in FIGS. 1 and 6.

I claim:

1. A collet chuck for gripping a tubular workpiece at two axially spaced cylindrical surfaces comprising a body having a central axis and a cylindrical guide surface thereon concentric with said central axis, a collet sleeve axially slideable on said guide surface, said collet sleeve being resiliently flexible in a radial direction and having first and second work-gripping surfaces thereon spaced axially apart to correspond with the axial spacing of said cylindrical surfaces on the workpiece, said work-gripping surfaces being adapted to be radially displaced to grip and release the workpiece, said collet sleeve having first and second opposed conical surfaces thereon aligned generally radially with the first and second work-gripping surfaces on the collet sleeve, said body having a conical surface thereon adapted to be engaged by the first conical surface on the collet sleeve to displace said first work-gripping surface radially in the work-gripping direction in response to axial movement of the collet sleeve in one direction, means biasing the collet sleeve axially in said one direction, a collet actuator mounted on said body for axial movement thereon, said actuator having a conical surface thereon adapted to engage the second conical surface on the collet sleeve and displace the second work-gripping surface in the work-engaging direction in response to movement of the actuator on the body in said one direction, abutment means on said actuator engageable with the collet sleeve to shift it axially in a direction opposite that in which it is biased when the actuator is shifted axially opposite to said one direction, the radial dimensions of said conical surfaces being such that, upon initial movement of said actuator in said one direction, said abutment means releases said collet sleeve and the collet sleeve is shifted axially in said one direction under the influence of said biasing means to interengage said first conical surface on the collet sleeve with the conical surface on said body and, upon continued axial movement of the actuator in said one direction, the second conical surface on the collet sleeve is engaged by the conical surface of the actuator whereby the clamping force exerted on the workpiece by the first work-gripping surface is determined by the force of said biasing means and the clamping force exerted on the workpiece by the second work-gripping surface is determined by the axial force on the actuator.

2. A chuck as called for in claim 1 wherein the two work-gripping surfaces on the collet sleeve are of different diameters.

3. A chuck as called for in claim 1 wherein the conical surfaces on the collet sleeve are disposed on the inner periphery thereof and the work-gripping surfaces are disposed on the outer periphery thereof.

4. A chuck as called for in claim 3 wherein said body has a central axial bore concentric with the conical surface thereon, said actuator having a shank slideably engaging said bore.

5. A chuck as called for in claim 1 wherein said collet sleeve has an annular disc fixed thereon for axial movement therewith, said abutment means being adapted to engage said disc to shift the collet sleeve in said direction opposite to that in which it is biased.

6. A chuck as called for in claim 5 wherein said biasing means are disposed between said body and disc.

7. A chuck as called for in claim 6 wherein said biasing means comprises a plurality of compression springs.

8. A chuck as called for in claim 1 wherein said collet sleeve is slideably guided on said body adjacent one end thereof, the opposite end of the collet sleeve being the free end thereof over which a workpiece is adapted to be telescoped.

9. A chuck as called for in claim 8 wherein the second conical surface on the collet sleeve is disposed adjacent the free end thereof.

10. A chuck as called for in claim 9 wherein the second work-gripping surface has a diameter smaller than the first work-gripping surface.

11. A chuck as called for in claim 1 wherein said body has an axial central bore, said actuator comprising a shaft slideably mounted within said bore, said guide surface on the body being concentric with said bore and spaced radially outwardly therefrom.

12. A chuck as called for in claim 11 wherein said actuator has a radially outwardly extending flange thereon which comprises said abutment means and including an annular disc fixedly secured to the collet sleeve and adapted to be engaged by said flange when the actuator is moved in said one direction.

13. A chuck as called for in claim 12 including means on said actuator adapted for connection with an axially reciprocating drawbar.

* * * * *